United States Patent [19]
Marschall

[11] 3,822,786
[45] July 9, 1974

[54] APPARATUS FOR TREATING AND PURIFYING SEWAGE, PARTICULARLY SEWAGE CONTAMINATED WITH DETERGENTS

[76] Inventor: Karl Marschall, 317 Zenogame, Vienna, Austria

[22] Filed: June 30, 1972

[21] Appl. No.: 268,203

Related U.S. Application Data

[62] Division of Ser. No. 96,246, Dec. 8, 1970, Pat. No. 3,733,268.

[52] U.S. Cl................... 210/108, 210/195, 210/202
[51] Int. Cl................................................ C02b 1/38
[58] Field of Search ............ 210/63, 192, 201, 202, 210/40, 60, 73, 64, 195, 197, 205, 259, 27, 108

[56] References Cited
UNITED STATES PATENTS

| | | | |
|---|---|---|---|
| 1,915,240 | 6/1933 | Putnam............................ | 210/63 X |
| 2,405,553 | 8/1946 | Allison............................. | 210/63 |
| 3,296,122 | 1/1967 | Karassik et al. ................. | 210/63 X |
| 3,326,747 | 6/1967 | Ryan et al........................ | 210/63 X |
| 3,377,271 | 4/1968 | Cann................................ | 210/63 X |
| 3,455,820 | 7/1969 | Joyce et al....................... | 210/40 |
| 3,545,619 | 12/1970 | Ettlich et al. .................... | 210/202 X |
| 3,549,528 | 12/1970 | Armstrong....................... | 210/63 X |
| 3,577,341 | 4/1971 | Keith et al....................... | 210/202 X |
| 3,650,950 | 3/1972 | White .............................. | 210/197 X |
| 3,730,881 | 5/1973 | Armstrong....................... | 210/195 X |

OTHER PUBLICATIONS

Kwie, William W., "Ozone Treats Wastestreams from Polymer Plant," Water & Sewage Works, 116, p. 74, (1969).

*Primary Examiner*—Thomas G. Wyse
*Attorney, Agent, or Firm*—Bacon and Thomas

[57] ABSTRACT

The sewage purification apparatus includes an ozonizing container in which the sewage is recirculated and purified by contact with ozine at substantially atmospheric pressure after passing through a separator container where oil, grease, fat, and solvents are separated and a reaction container where dirt and colloidal matter sedimented by a flocculating agent, are removed. The purified water withdrawn from the ozonizing container passes through an activated carbon filter where residual ozone in the water is converted into oxygen, and the gasses in the upper portion of the ozonizing container pass through an activated carbon filter where surplus ozone is converted to oxygen before the gasses escape to atmosphere.

9 Claims, 1 Drawing Figure

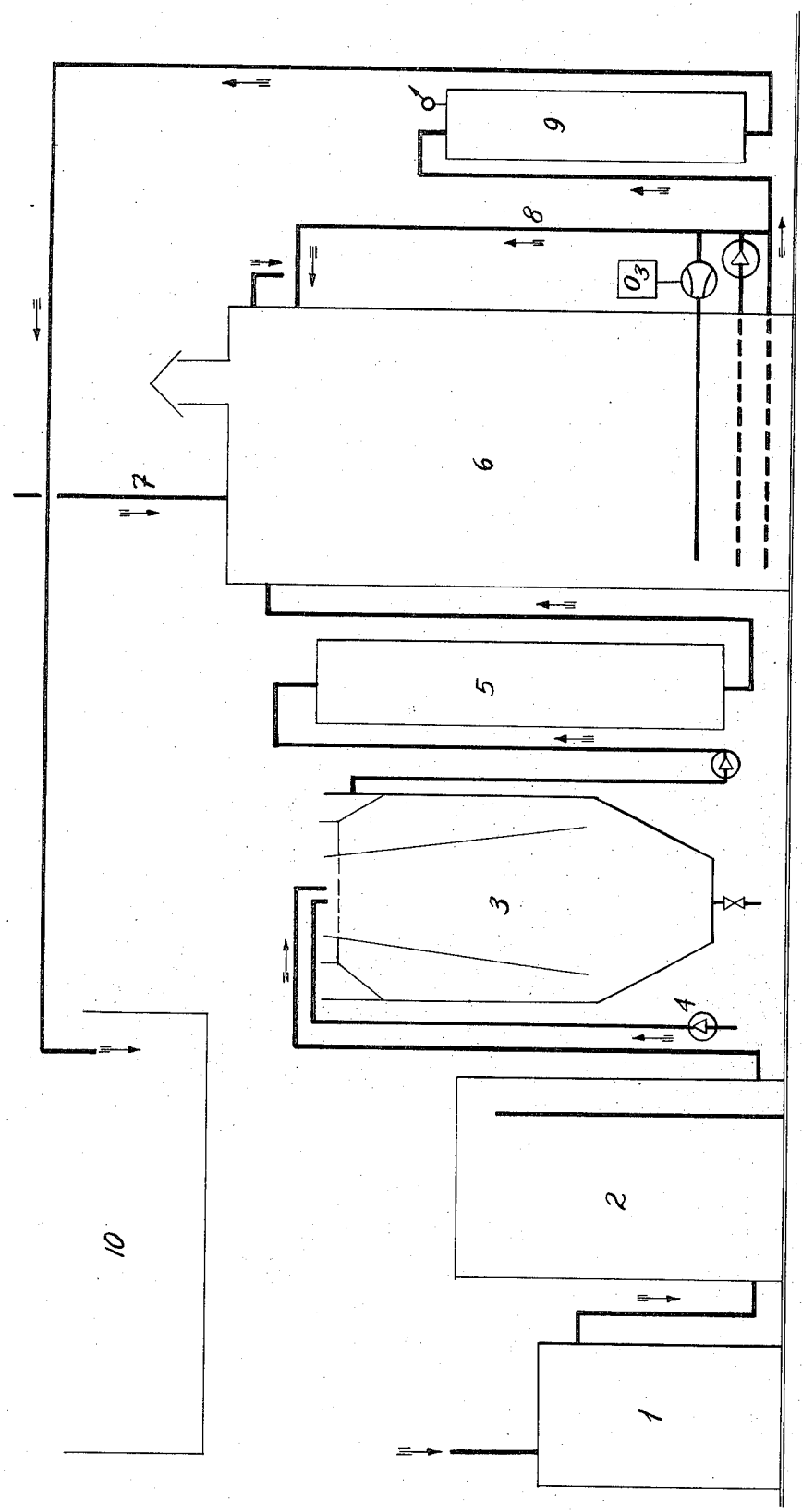

APPARATUS FOR TREATING AND PURIFYING SEWAGE, PARTICULARLY SEWAGE CONTAMINATED WITH DETERGENTS

This is a division of application Ser. No. 96,246, filed Dec. 8, 1970, now U.S. Pat. No. 3,733,268.

An economic process for the purification of sewage which is contaminated with detergents to obtain water of high purity which may be re-used is not yet available. It is an object of the present invention to treat sewage so that the purified water can be re-used. It is already known to sterilize water by a treatment with ozone. It is also known to purify contaminated water by a treatment with ozone to oxidize the impurities. Such processes are disclosed, e.g., in the Austrian Pat. No. 214,808 and the Printed German applications Nos. 1,239,994, 1,269,960 and 1,256,164.

The present invention relates to an apparatus and process for treating or purifying sewage, particularly of sewage which is contaminated with detergents, by a treatment with ozone. The process is especially adaptable for use in treating sewage from car-washing installations, laundries and the like. The process may include a preliminary treatment resulting in a separation of oil. The flocculated particles may be aerated, precipitated and, if desired, removed. Finally, the prepurified sewage is contacted in a container under substantially atmospheric pressure with a mixture of ozone and other gases and the sewage to be reacted or to maintained in contact with the gases is recirculated in that the sewage is sucked from the lower portion of the container and is conducted through a recirculation system which is disposed outside of the container and consists particularly of a pipe of suitable size, whereby the sewage is returned into the ozonizing container and is thus recirculated. In the process, sewage to be purified is subjected to a prepurification, which may comprise a separation of oil and an aeration, filtration and removal of the flocculated particles, and the prepurified sewage is contacted with ozone and is moved in a recirculation system under substantially atmospheric pressure, the ozone or a mixture of ozone and other gases being supplied in a container.

The present process differs from the known processes in that it is carried out under substantially atmospheric pressure. The pressures which arise generally do not exceed 0.5 kilogram per square centimeter above atmospheric pressure. The present process has the advantage that the need for a supervision of pressure vessels and other disadvantages involved in the use of pressure vessels are eliminated.

The single FIGURE of the drawings shows a preferred arrangement of the apparatus of this invention for receiving and purifying sewage and for collecting the purified sewage in the form of water.

The process according to the invention may be carried out, by way of example, as follows: Sewage, such as that from car-washing installations, laundries and the like, which is contaminated with detergents as well as with oil, grease and fat must be subjected first to a coarse purification for a removal of oil, grease and fat as well as solvents. The sewage is initially collected in a collecting container 1 and is supplied to a separator 2 for a removal of oil, grease and fat as well as of solvents, such as gasoline, toluene, acetone, etc. Air is bubbled through this container to accelerate the separation of oil and to strip the volatile solvents. After the removal of oil, the sewage flows into a reaction container 3, in which chemicals consisting of a flocculating agent are added at a metered rate. The supply of a flocculating agent to the reaction container results in a sedimentation of a major part of the dirt and of the colloids.

The supply of the flocculating agent may be controlled by a flow controller 4 or a metering pump 4. Sludge is periodically withdrawn from the separator for oil, grease and fat and from the reaction container under control of a timer. The sewage from which dirt has been removed is passed through a gravel filter 5, which retains any remaining coarse particles of dirt and flocculating agent. The gravel filter unit is designed for a fully automatic backwashing of the gravel filter. The backwashing of the gravel filter is initiated under control of a differential pressure gauge, which must be operable only when the plant is shut down so that backwashing during normal operation is prevented.

The container 6 is open-topped and provided with an exhaust pipe through which the surplus air-ozone mixture can escape freely. An activated carbon filter may be incorporated in the exhaust pipe to break down the surplus ozone in the exhaust air into oxygen. Alternatively, this exhaust air may be used for a conditioning of air in rooms.

The ozone-contacting container may be made of steel or concrete.

To make up for losses of water fresh water 7 is supplied into the gas-contacting container 6 from the top thereof.

When the sewage has been recirculated in the plant 8 it is passed through an activated carbon filter 9 which breaks down residual ozone into oxygen. From the filter, the water flows into the pure water tank 10 for reuse.

The invention relates also to an installation which serves to carry out the process and in which the several components of the plant are connected in a practical arrangement. Such plants may be used to great advantage particularly in connection with laundries having cleaning units in which acetone is employed, as well as in carwashing installations. In this case, the water consumption is much reduced, which is of special importance in locations where water is not available in sufficient quantities or where the cost of water is high for any reason whatever.

I claim:

1. Apparatus for treating sewage contaminated with detergents and purifying it for re-use as water comprising:
   A. a separator container for receiving sewage to be treated from a sewage producing installation and having means for separating from said sewage oil, grease, fat and solvents;
   B. a reaction container connected by conduit means with said separator container for receiving therefrom sewage being purified;
   C. means for adding to the sewage in said reaction container a flocculating agent for causing sedimentation of the dirt and colloids in said sewage;
   D. means for removing from the reaction container sedimented dirt and colloidal matter;
   E. filter means for retaining particulate material connected by conduit means with said reaction container for receiving therefrom sewage being purified;

F. an ozonizing container connected by conduit means with said filter means for receiving therefrom filtered sewage being purified;

G. means connecting a source of ozone under pressure with said ozonizing container adjacent the lower portion thereof for introducing ozone into the sewage contained therein and decomposing said detergents;

H. means for recirculating the sewage in said ozonizing container from the lower portion to the upper portion thereof for completing the decomposition of said detergents and thereby purifying the sewage and converting it to reusable water devoid of detergents, the upper end portion of said ozonizing container being under substantially atmospheric pressure and being provided with passage means for the escape therethrough to atmosphere of oxygen, ozone and gasses in the ozonizing container; and I. storage means connected by fluid conducting means with said ozonizing container for receiving therefrom purified water for re-use.

2. Apparatus according to claim 1, wherein said fluid conducting means includes an activated carbon filter for breaking down into oxygen residual ozone in the purified water passing therethrough.

3. Apparatus according to claim 1, wherein said passage means includes an activated carbon filter for breaking down surplus ozone into oxygen in the exhaust gasses passing therethrough.

4. Apparatus according to claim 1, including means for introducing into the lower portion of the separator container, air under pressure for accelerating the separation of oil and to strip volatile solvents from the sewage therein.

5. Apparatus according to claim 1, including means for periodically withdrawing sludge under control of a timer from said separator container and from said reaction container.

6. Apparatus according to claim 1, including means operable only when said apparatus is shutdown for automatically backwashing said filter means.

7. Apparatus according to claim 1, including means for adding fresh make-up water to said ozonizing container.

8. Apparatus according to claim 1, wherein said means for recirculating the sewage in said ozonizing container comprises piping disposed outside said ozonizing container and having an inlet connected with the lower portion of the ozonizing container and an outlet connected with the upper portion thereof, and means for circulating sewage being purified in said ozonizing container through said piping.

9. Apparatus according to claim 1, in which the pressure in the upper portion of the ozonizing container does not exceed 0.5 kg per square centimeter above normal atmospheric pressure.

* * * * *